United States Patent
Hayakawa

(10) Patent No.: US 11,086,923 B2
(45) Date of Patent: Aug. 10, 2021

(54) COMMUNICATION APPARATUS, CONTROL METHOD, AND STORAGE MEDIUM

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 15/997,475

(22) Filed: Jun. 4, 2018

(65) Prior Publication Data

US 2018/0357232 A1  Dec. 13, 2018

(30) Foreign Application Priority Data

Jun. 13, 2017 (JP) .............................. JP2017-115991

(51) Int. Cl.
*G06F 17/00* (2019.01)
*G06F 16/51* (2019.01)
*G06F 3/0482* (2013.01)

(52) U.S. Cl.
CPC ............ *G06F 16/51* (2019.01); *G06F 3/0482* (2013.01)

(58) Field of Classification Search
None
See application file for complete search history.

(56) References Cited

U.S. PATENT DOCUMENTS

| 7,248,290 B2 * | 7/2007 | Shioji | G11B 27/11 348/231.2 |
| 8,325,398 B2 * | 12/2012 | Satomi | G11B 27/034 358/1.15 |
| 2016/0154817 A1 * | 6/2016 | Mason, Jr. | G06F 16/1774 707/704 |

FOREIGN PATENT DOCUMENTS

| JP | 2003-030223 A | 1/2003 |
| JP | 2004-046313 A | 2/2004 |
| JP | 2007-249434 A | 9/2007 |
| JP | 2010-72934 A | 4/2010 |
| JP | 2010-154021 A | 7/2010 |
| JP | 2016-164748 A | 9/2016 |

* cited by examiner

*Primary Examiner* — Tuankhanh D Phan
(74) *Attorney, Agent, or Firm* — Canon U.S.A., Inc. IP Division

(57) ABSTRACT

In a case where a number of pieces of image data stored in a local storage of a communication apparatus reaches a number of pieces of image data for creating a photo album, the communication apparatus creates the photo album using the image data stored in the local storage without using image data stored in an external storage.

17 Claims, 14 Drawing Sheets

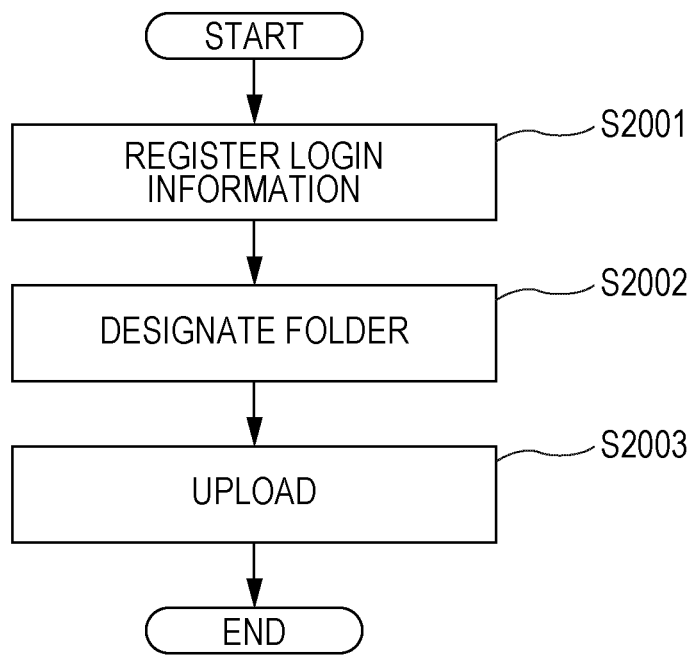

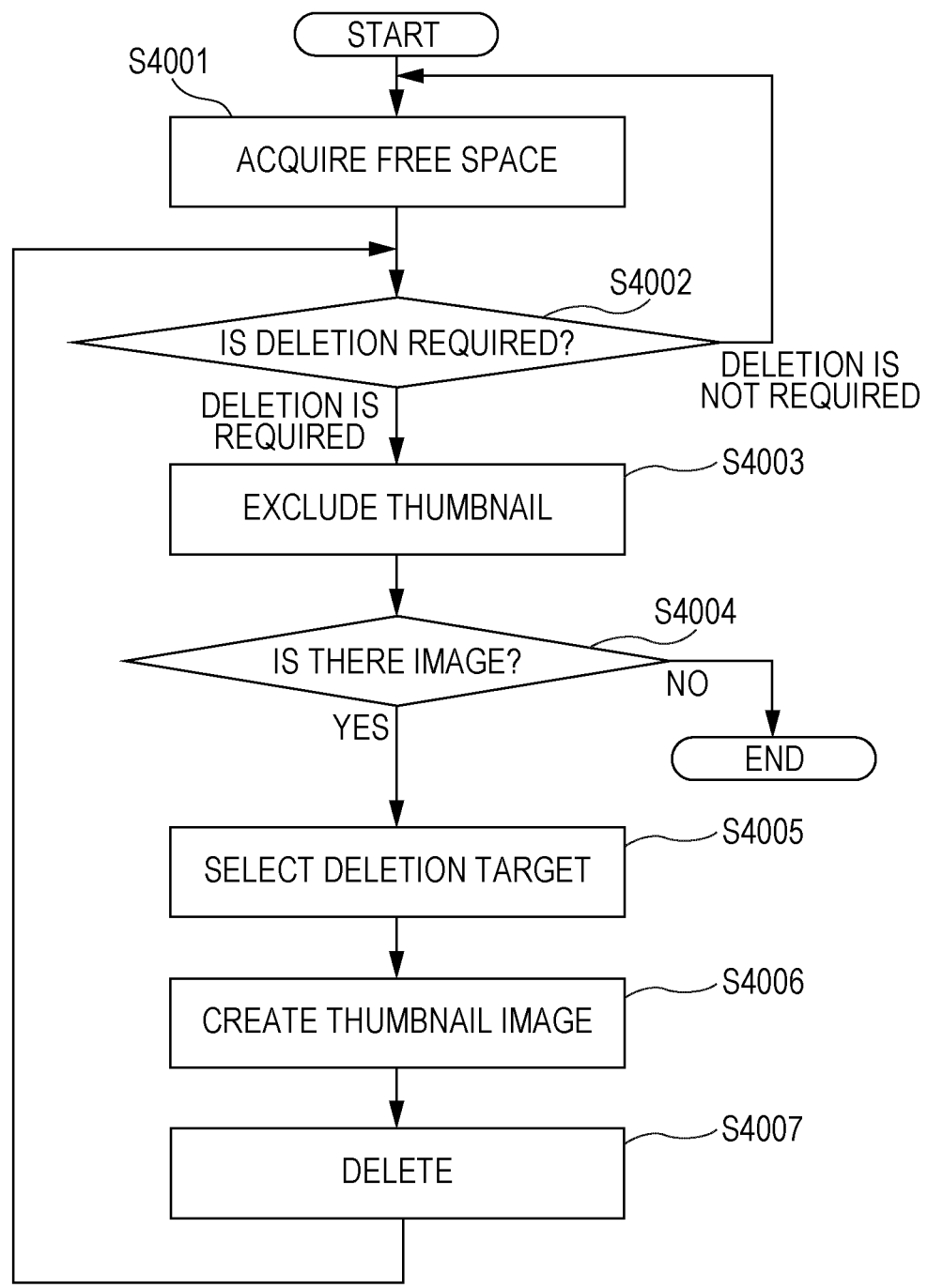

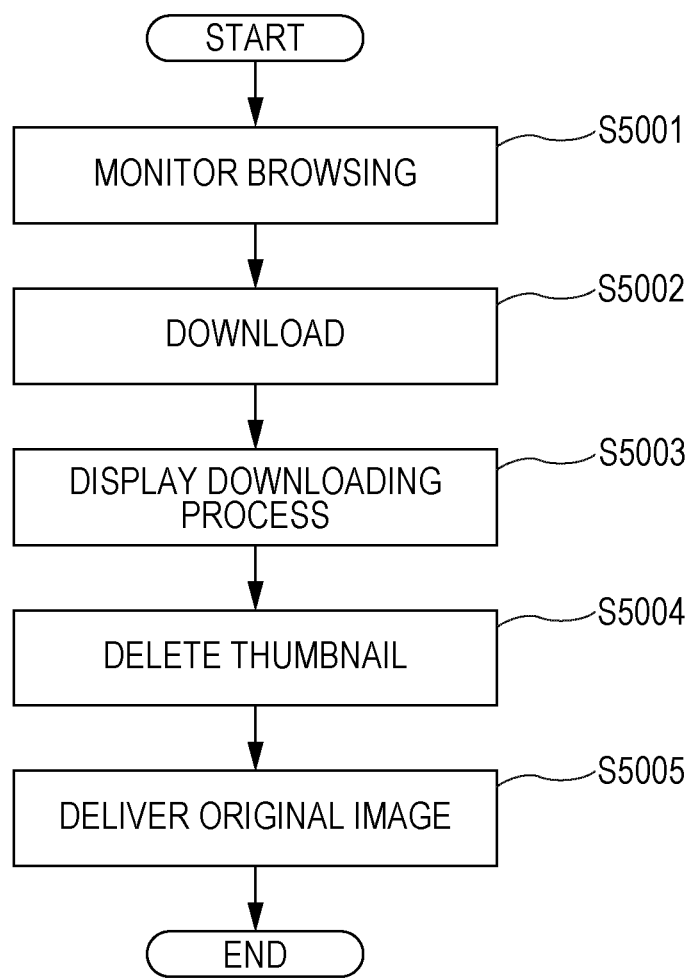

FIG. 8A-1

| SLOT ID | POSITION (x, y) | SIZE (w, h) | PRIORITY |
|---|---|---|---|
| 4001 | 30, 30 | 320, 270 | 3 |
| 4002 | 450, 60 | 200, 160 | 1 |
| 4003 | 100, 320 | 200, 160 | 1 |
| 4004 | 450, 320 | 200, 160 | 1 |

FIG. 8B-1

| SLOT ID | POSITION (x, y) | SIZE (w, h) | PRIORITY |
|---|---|---|---|
| 4011 | 100, 60 | 200, 160 | 1 |
| 4012 | 380, 30 | 320, 270 | 3 |
| 4013 | 100, 320 | 200, 160 | 1 |
| 4014 | 450, 320 | 200, 160 | 1 |

FIG. 8C-1

| SLOT ID | POSITION (x, y) | SIZE (w, h) | PRIORITY |
|---|---|---|---|
| 4021 | 100, 60 | 200, 160 | 1 |
| 4022 | 450, 60 | 200, 160 | 1 |
| 4023 | 30, 250 | 320, 270 | 3 |
| 4024 | 450, 320 | 200, 160 | 1 |

FIG. 8D-1

| SLOT ID | POSITION (x, y) | SIZE (w, h) | PRIORITY |
|---|---|---|---|
| 4031 | 100, 60 | 200, 160 | 1 |
| 4032 | 450, 60 | 200, 160 | 1 |
| 4033 | 100, 320 | 200, 160 | 1 |
| 4034 | 380, 250 | 320, 270 | 3 |

FIG. 9

| ID | SHOOTING DATE/TIME | IMAGE DATA | SCORE |
|---|---|---|---|
| 001 | 2016/12/22 10:33:51 | BLOB data | 13 |
| 002 | 2016/12/22 14:22:15 | BLOB data | 81 |
| 003 | 2016/12/22 15:33:11 | BLOB data | 17 |
| 004 | 2016/12/23 10:16:51 | BLOB data | 85 |
| 005 | 2016/12/23 12:11:51 | BLOB data | 39 |
| 006 | 2016/12/24 08:15:10 | BLOB data | 36 |
| 007 | 2016/12/24 15:16:61 | BLOB data | 13 |

FIG. 10

| IMAGE ID | SCORE | A-1 | | B-1 | | C-1 | | D-1 | |
|---|---|---|---|---|---|---|---|---|---|
| | | PRIORITY | CALCULATED VALUE | PRIORITY | CALCULATED VALUE | PRIORITY | CALCULATED VALUE | PRIORITY | CALCULATED VALUE |
| 002 | 81 | 3 | 243 | 1 | 81 | 1 | 81 | 1 | 81 |
| 004 | 85 | 1 | 85 | 3 | 255 | 1 | 85 | 1 | 85 |
| 005 | 39 | 1 | 39 | 1 | 39 | 3 | 117 | 1 | 39 |
| 006 | 36 | 1 | 36 | 1 | 36 | 1 | 36 | 3 | 108 |
| TOTAL | | | 403 | | 411 | | 319 | | 313 |

COMMUNICATION APPARATUS, CONTROL METHOD, AND STORAGE MEDIUM

BACKGROUND

Field of the Disclosure

The present disclosure generally relates to communications and, more particularly, to a communication apparatus, a control method, and a storage medium for automatically laying out a plurality of images captured by a digital camera or the like by using layout information described in a template to create a photo album.

Description of the Related Art

A technique for selecting a folder storing image data, analyzing the selected image data, performing page segmentation, and selecting and arranging a template design to automatically create a photo album has heretofore been known (Japanese Patent Laid-Open No. 2010-72934).

However, in the technique discussed in Japanese Patent Laid-Open No. 2010-72934, a case where the number of pieces of image data is less than the number of pieces of image data for creating a photo album is not taken into consideration.

SUMMARY

The present disclosure generally relates to improving the user-friendliness when the number of pieces of image data is less than the number of pieces of image data for creating a photo album.

According to one or more aspects of the present disclosure, a communication apparatus holds first original image data and thumbnail image data corresponding to second original image data, the second original image data corresponding to the thumbnail image data being held in an external storage capable of communicating with the communication apparatus, the communication apparatus including: a specifying unit configured to specify a number of pieces of image data for creating an album; and a control unit configured to execute processing of creating the album using the first original image data stored in a local storage of the communication apparatus without using the second original image data stored in the external storage in a case where a number of pieces of the first original image data stored in the local storage is equal to or greater than the specified number, and execute processing of creating the album using the second original image data stored in the external storage and the first original image data stored in the local storage in a case where the number of pieces of the first original image data stored in the local storage is less than the specified number.

Further features of the present disclosure will become apparent from the following description of exemplary embodiments with reference to the attached drawings.

BRIEF DESCRIPTION OF THE DRAWINGS

FIG. 2 is a flowchart illustrating the first exemplary embodiment.

FIG. 3 illustrates a user interface (UI) according to the first exemplary embodiment.

FIG. 4 is a flowchart illustrating deletion processing according to the first exemplary embodiment.

FIG. 5 is a flowchart illustrating download processing according to the first exemplary embodiment.

FIGS. 7A-1 to 7D-1 illustrate template data according to the first exemplary embodiment.

FIGS. 8A-1 to 8D-1 illustrate template data tables according to the first exemplary embodiment.

FIG. 9 illustrates image data according to the first exemplary embodiment.

FIG. 10 illustrates an automatic photo album layout calculation table according to the first exemplary embodiment.

DESCRIPTION OF THE EMBODIMENTS

Figure 1:
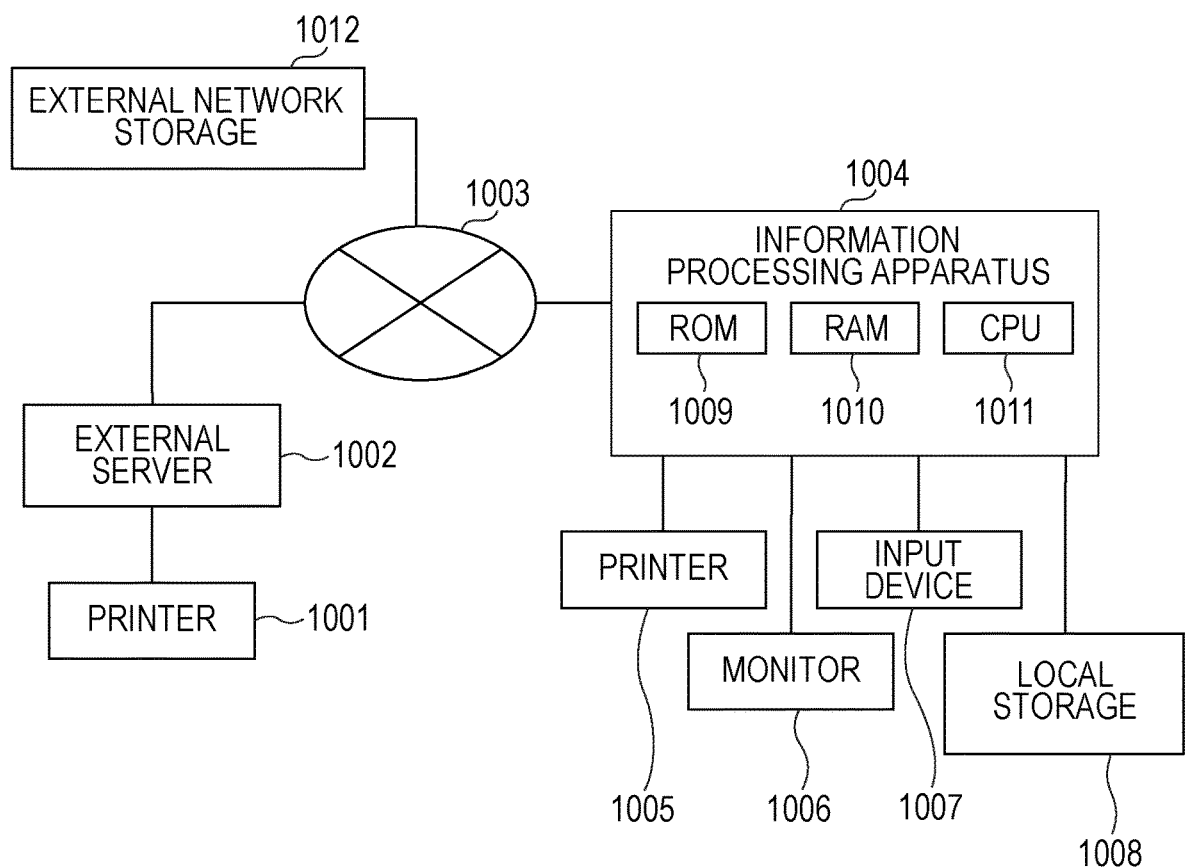
FIG. 1 is a configuration diagram illustrating an information processing apparatus according to a first exemplary embodiment.

Exemplary embodiments of the present disclosure will be described in detail below with reference to the accompanying drawings. The following exemplary embodiments are not intended to limit the present disclosure set forth in the claims, and all combinations of features described in the following exemplary embodiments are not necessarily indispensable for a solution of the present disclosure.

First Exemplary Embodiment

First, a configuration of an information processing apparatus (communication apparatus) 1004 to be used in an exemplary embodiment of the present disclosure will be described with reference to FIG. 1. The information processing apparatus 1004 to be used in the present exemplary embodiment is capable of creating an album (e.g., a photo album or a photobook) from input image data and is also capable of outputting the created album as print data or uploading the created album to an external server. The information processing apparatus 1004 may include a read only memory (ROM) 1009, a random access memory (RAM) 1010, and a central processing unit (CPU) 1011. The information processing apparatus 1004 may also include an input/output interface (not illustrated) for connecting to a printer 1005, a monitor 1006, an input device 1007, a local storage 1008, and a network 1003. The CPU 1011, which may include one or more processors and one or more memories, is a central processing unit and may execute an operation system program (hereinafter abbreviated as an OS), which is stored in the local storage 1008, the ROM 1009, or the RAM 1010, and may thereby control the entire information processing apparatus 1004. The CPU 1011 may execute programs stored in the ROM 1009 or the RAM 1010 to thereby execute functions of the information processing apparatus 1004. The ROM 1009 is a read only memory and stores programs. The RAM 1010 is a random access memory and stores programs if the RAM 1010 is used as a work memory or a non-volatile RAM of the CPU 1011.

The information processing apparatus 1004 is connected to each of an external server 1002 and an external network storage 1012 via the network 1003, and various devices transmit and receive information via the network 1003. The external server 1002 has an input/output interface (not illustrated) for connecting to a printer 1001 and is connected to the printer 1001. An album created by the information processing apparatus 1004 is uploaded to the external server 1002 via the network 1003. If the uploaded album can be printed, the external server outputs the album to the printer 1001. Specifically, the information processing apparatus 1004 generates album data by laying out image data through processing illustrated in FIG. 6 described below, and transmits the album data to the external server 1002. The external server 1002 generates print data based on the album data and transmits the generated print data to the printer 1001.

The external server is, for example, an album order/management server. A user of the information processing apparatus 1004 uploads the album created by the information processing apparatus 1004 and completes a procedure for purchasing the album, and then transmits the print data corresponding to the album to the printer 1001. After that, a print product output from the printer 1001 is bound into a book and delivered to the user as a photobook.

The external network storage 1012 on the network stores the data uploaded from the information processing apparatus 1004. The information processing apparatus 1004 can download and acquire the stored data from the information processing apparatus 1004. The external network storage 1012 is accessible not only from the information processing apparatus 1004, but also from other information processing apparatuses connected to the network 1003. Accordingly, the user may perform authentication processing to upload or download various data from the information processing apparatus 1004 to the external network storage 1012.

The printer 1005 is a printer for printing the print data created by the information processing apparatus 1004. The user who owns the created album may use the printer 1005 to print the print data and bind a print product into a book to thereby complete the album. The monitor 1006 displays images according to an instruction from the information processing apparatus 1004. The input device 1007 is a keyboard, a pointing device, or the like for inputting data to the information processing apparatus 1004. The input device 1007 may be a touch panel having a configuration in which a monitor and an input device are integrated together. The local storage 1008 is a storage device, such as a hard disk drive (HDD) or a solid state drive (SSD), for storing image data, templates, and the like.

FIG. 1 illustrates that the information processing apparatus 1004 is separated from the monitor 1006, the input device 1007, and the local storage 1008. However, depending on the configuration of the information processing apparatus 1004, the information processing apparatus 1004 may have an integrated configuration and may include a monitor, an input device, and a local storage (the RAM of the information processing apparatus may be shared).

Referring next to FIG. 2, a method in which the information processing apparatus 1004 synchronizes data stored in the external network storage 1012 with data stored in the local storage 1008 will be described. In step S2001, the user causes the CPU 1011 to register login information in the information processing apparatus 1004.

For example, the CPU 1011 displays a login screen as illustrated in FIG. 3 and may receive, from the user, an identifier (ID) (identification information) and a password for authentication of the external network storage 1012. The received ID and password may be recorded on the information processing apparatus 1004 and the authentication may be performed using the ID and password recorded on the information processing apparatus 1004, as needed. Alternatively, a user interface (UI) illustrated in FIG. 3 may be displayed as needed to input the ID and password without recording the ID and password on the information processing apparatus 1004. Assume in the present exemplary embodiment that the ID and password are recorded on the information processing apparatus 1004 and the ID and password recorded on the information processing apparatus 1004 are used according to authentication. Also assume in the present exemplary embodiment that the authentication is performed by using a correct ID and a correct password, and thus description of error processing to be performed if an incorrect ID or password is used is omitted.

In step S2002, the CPU 1011 designates a folder in the local storage 1008 (a folder in the information processing apparatus (communication apparatus)) to be synchronized with the external network storage 1012 according to an instruction from the user. In the present exemplary embodiment, there is a need to treat image data so as to create a photo album. Accordingly, in step S2002, the CPU 1011 designates a folder storing image data according to an instruction from the user. Further, unless otherwise noted, data to be synchronized between the external network storage 1012 and the local storage 1008 is image data.

In step S2003, the CPU 1011 uploads the image data in the designated folder to the external network storage 1012 by an application executed on the background. Since user authentication may be used to upload the image data, the CPU 1011 may use the ID and password input in step S2001.

As described above, the image data stored in the local storage is uploaded to the external network storage 1012, so that the content of the folder selected in the local storage 1008 is synchronized with the content of the external network storage 1012.

Referring next to FIG. 4, a method in which the information processing apparatus 1004 deletes the synchronized image data from the local storage 1008 will be described.

In step S4001, the CPU 1011 acquires a free space in the local storage 1008 by the application executed on the background.

In step S4002, the CPU 1011 determines whether the free space in the local storage 1008 is equal to or less than a preliminarily set threshold. If the free space in the local storage 1008 is equal to or less than the preliminarily set threshold, the CPU 1011 determines that there is a need to delete the image data. On the other hand, if the free space in the local storage 1008 exceeds the preliminarily set threshold, the CPU 1011 determines that the free space is sufficient and thus there is no need to delete the image data, and the processing proceeds to step S4001. The processing of steps S4001 and S4002 is repeated to thereby monitor the free space in the local storage 1008. If the frequency of executing the monitoring processing is extremely high, an unnecessary load may be applied to the information processing apparatus 1004.

Accordingly, the frequency of executing the monitoring processing may be reduced by placing a restriction such that the monitoring processing is executed only once per hour. Further, the frequency of executing the monitoring processing may be reduced by executing the monitoring processing at a timing when a file access occurs. If the free space in the local storage 1008 is equal to or less than the threshold, there is a need to increase the free space by performing processing of appropriately deleting the image data in the local storage 1008. Accordingly, the processing of the CPU 1011 proceeds to step S4003.

In step S4003, the CPU 1011 determines image data to be deleted from the synchronized image data. Therefore, the CPU 1011 refers to the folder selected as a folder to be synchronized. In the folder selected as a folder to be synchronized, image data and thumbnail images of already deleted image data are present. In this case, when the CPU 1011 selects the image data to be deleted, the CPU 1011 excludes the thumbnail images. In step S4004, if image data that can be deleted remains, the CPU 1011 proceeds to step S4005. In the processing of step S4003, if only thumbnail images are present in the folder selected as a folder to be synchronized, there is no image data to be deleted, and thus the free space in the local storage 1008 may not be increased by deleting the image data. Accordingly, the processing illustrated in FIG. 4 is terminated.

In step S4005, the CPU 1011 selects one piece of image data to be deleted from the image data that can be deleted. For example, image data to be deleted is selected by, for example, setting, as image data to be deleted, image data with the earliest access date and time, or setting image data to be deleted by using a value of rating by the user on each image. In step S4006, the CPU 1011 creates thumbnail image data on the image data to be deleted that is selected in step S4005. Specifically, the processing of step S4006 is executed before execution of image data deletion processing in step S4007 described below, thereby enabling the thumbnail image data to be left even after the image data is deleted. Accordingly, the user can select the image data deleted from the information processing apparatus 1004 by using thumbnail images. Further, when thumbnail image data is created and stored in the local storage 1008, information about image data obtained before creating the thumbnail image data, such as the width or height of images, Exif information, and rating by the user can also be stored. Not image data, but information that characterizes the image is stored in addition to the thumbnail image data, thereby enabling rearrangement or image selection based on information that eliminates the need for access to the image data, such as information about rating by the user, during browsing of thumbnail images. In the following description, the image data obtained before creating thumbnail images is referred to as original image data so as to be distinguished from the thumbnail image data.

In step S4007, the CPU 1011 deletes, from the local storage 1008, the original image data to be deleted that is selected in step S4005. This deletion processing enables the free space in the local storage 1008 to be increased. After completion of the processing, the processing proceeds to step S4002.

As described above, the synchronized image data is sequentially deleted according to the capacity of the local storage 1008.

Referring next to FIG. 5, processing to be performed by the information processing apparatus 1004 when thumbnail image data is selected in a state where only the thumbnail image data is stored will be described.

As described above with reference to the flowchart of FIG. 4, the thumbnail image data is generated and then the original image data corresponding to the thumbnail image data is deleted from the local storage 1008. On the other hand, since the thumbnail image is displayed on the monitor 1006, the user can browse the thumbnail image, but cannot open the image data corresponding to the thumbnail image selected by the user and browse large-size image data. Accordingly, there is a need to perform processing in which the information processing apparatus 1004 downloads the original image data from the external network storage 1012 at a timing when the user selects a thumbnail image, and replaces the original image data with the thumbnail image data. FIG. 5 illustrates a flowchart for the processing.

In step S5001, the CPU 1011 monitors a timing when the thumbnail image data is opened. For example, the timing may be monitored by using a mechanism of an operation system (OS), or displaying thumbnail images using picture management software and monitoring a user browsing operation by the picture management software.

In step S5002, the CPU 1011 downloads the original image data corresponding to the thumbnail image data from the external network storage 1012 at the timing when the thumbnail image data is opened. Information indicating which thumbnail image data is associated with which original image data in the external network storage 1012 may be stored in association with the thumbnail image data, or may be stored in another database.

In step S5003, the CPU 1011 notifies the user that the data is being downloaded. Typical file reading processing is I/O processing of reading data from the HDD or the like, and the I/O processing is slower than arithmetic processing to be performed in the information processing apparatus 1004. Accordingly, the file reading progress may be displayed. Also, during the downloading process, the file reading progress may be displayed to notify the user that the data is being downloaded. Alternatively, an enlarged image based on the thumbnail image data may be displayed before the original image data is acquired, and the progress may be displayed on the enlarged display area.

In step S5004, upon completion of downloading the original image data, the CPU 1011 deletes the thumbnail image data and replaces the thumbnail image data with the downloaded original image data. Execution of this processing enables the user to open the same image data next time without downloading the image data from the network storage. By the processing of step S4005 illustrated in FIG. 4, the access date and time is written into the current time. This processing prevents the latest downloaded original image date from being easily selected as image data to be deleted in the processing of step S4005 illustrated in FIG. 4 even when the free space in the local storage 1008 is insufficient.

In step S5005, the CPU 1011 displays an image based on the downloaded original image data as an image to be displayed when the thumbnail image is selected. This processing enables the user to browse the original image data.

As described above, the synchronized image data is automatically downloaded when the image data is used by the information processing apparatus 1004.

Figure 6:
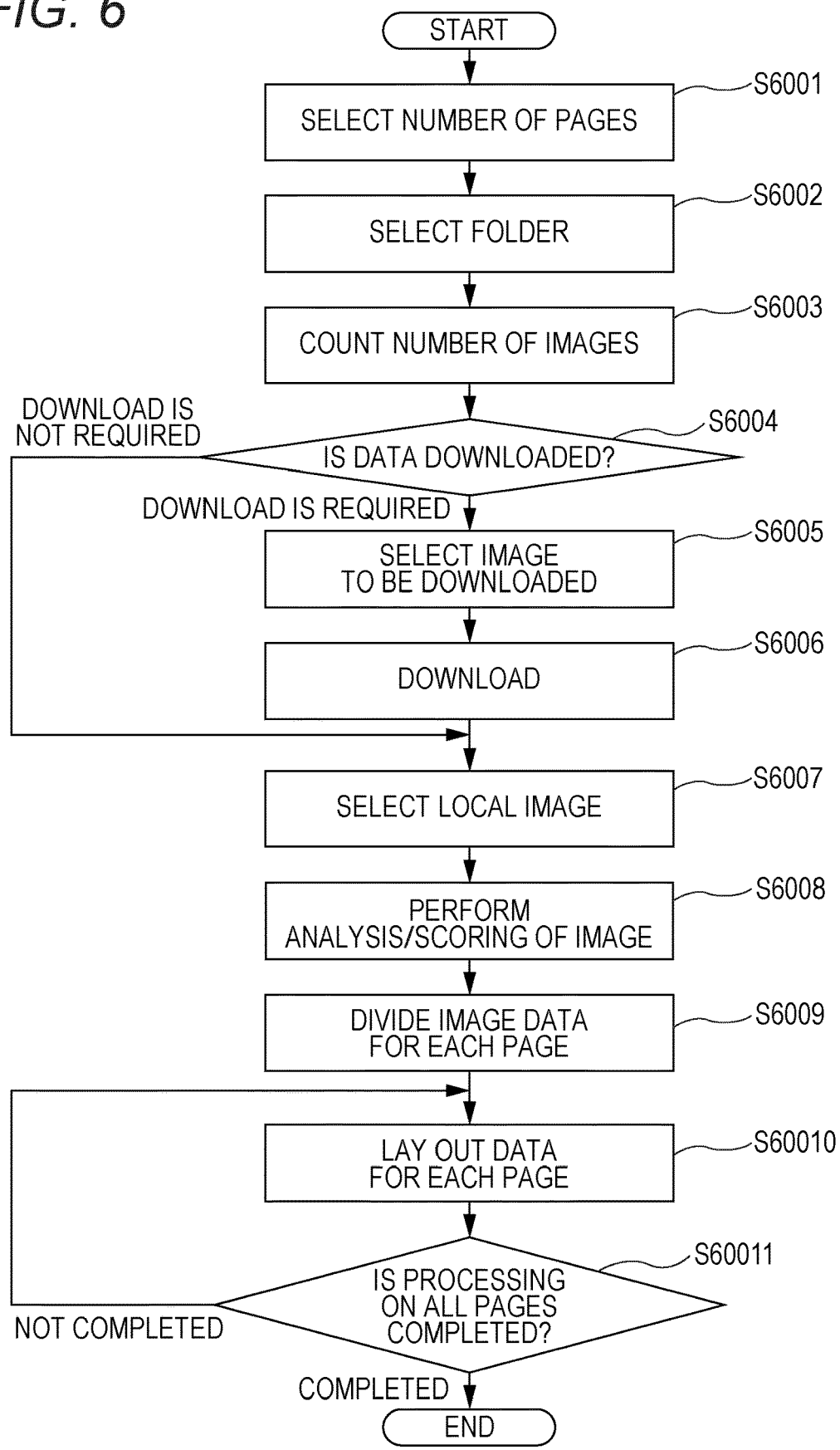
FIG. 6 is a flowchart illustrating photo album creation processing according to the first exemplary embodiment.

Next, photo album creation processing using a synchronized data folder that is executed in the information processing apparatus 1004 will be described with reference to FIG. 6.

Figures 1, 7A:
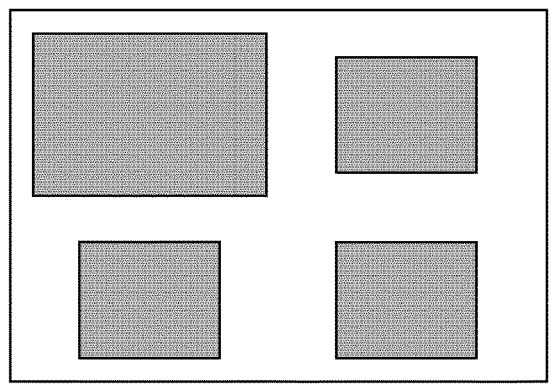
Figures 1, 7B:
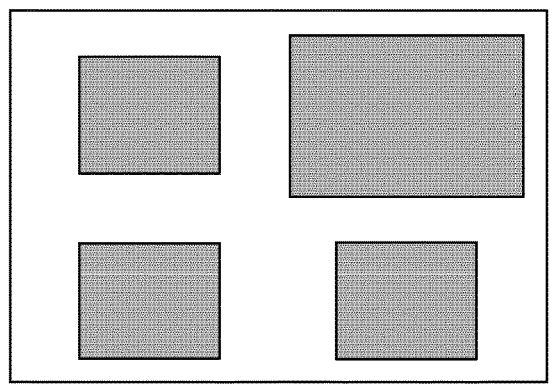
Figures 1, 7C:
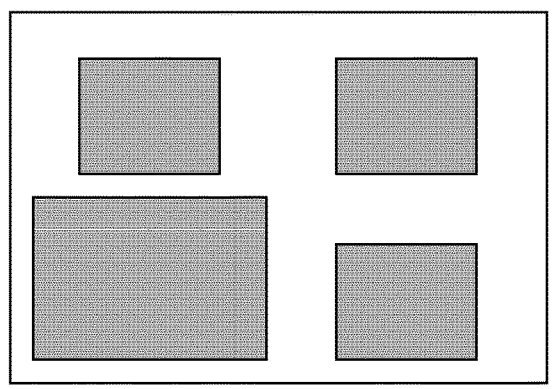
Figure 14:
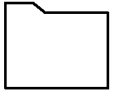
FIG. 14 illustrates an example of a screen for a photo album creation application.

In step S6001, the CPU 1011 accepts the selection of the number of pages of the photo album from the user. The user activates a photo album creation application on the information processing apparatus 1004, thereby displaying, for example, a screen for accepting the selection of the number of pages as illustrated in FIG. 14. The photo album creation application manages template data as illustrated in FIGS. 7A-1 to 8D-1. The tables illustrated in FIGS. 8A-1 to 8D-1 store coordinate values, priorities, and the like of each slot. The templates illustrated in FIGS. 7A-1 to 8D-1 are examples in which the number of image slots is four. A plurality of templates may be prepared by changing the number of image slots. The term "image slot" refers to an area in which images printed as a photo album are arranged.

In step S6002, the CPU 1011 accepts the selection of the folder in the local storage 1008 storing the image data. Assume herein that the user selects the folder that is synchronized with the network storage described above with reference to the flowcharts and diagrams of FIGS. 2 to 5. For example, on the screen illustrated in FIG. 14, "FOLDER1" is selected. The user can change the folder to another folder in the information processing apparatus 1004 by selecting an object located beside "FOLDER1".

When the information processing apparatus 1004 creates a photo album, the CPU 1011 loads the image data in the folder selected by the user and performs filtering processing on the image data by scoring the image data. The thumbnail image data may be stored in the synchronized folder by the processing of the flowchart illustrated in FIG. 4. If the CPU 1011 loads the image data in a state where the thumbnail image data is stored, the original image data corresponding to all thumbnail image data in the folder is downloaded by the processing of the flowchart illustrated in FIG. 5 and stored in the local storage 1008. As a result, a time and communication cost may be obtained for downloading the data. In the subsequent job, the capacity of the local storage 1008 may be obtained for storing the created photo album. However, if the original image data corresponding to all thumbnail image data in the synchronized folder is downloaded, there is a possibility that the free space for storing the photo album may be insufficient. If the free space is insufficient, the free space is automatically increased by the processing of the flowchart illustrated in FIG. 4. However, there is also a possibility that the original image data to be used for creating the photo album may be deleted. The present exemplary embodiment proposes a method for creating a photo album without requiring much downloading time and communication cost even in such a case.

Figure 15:
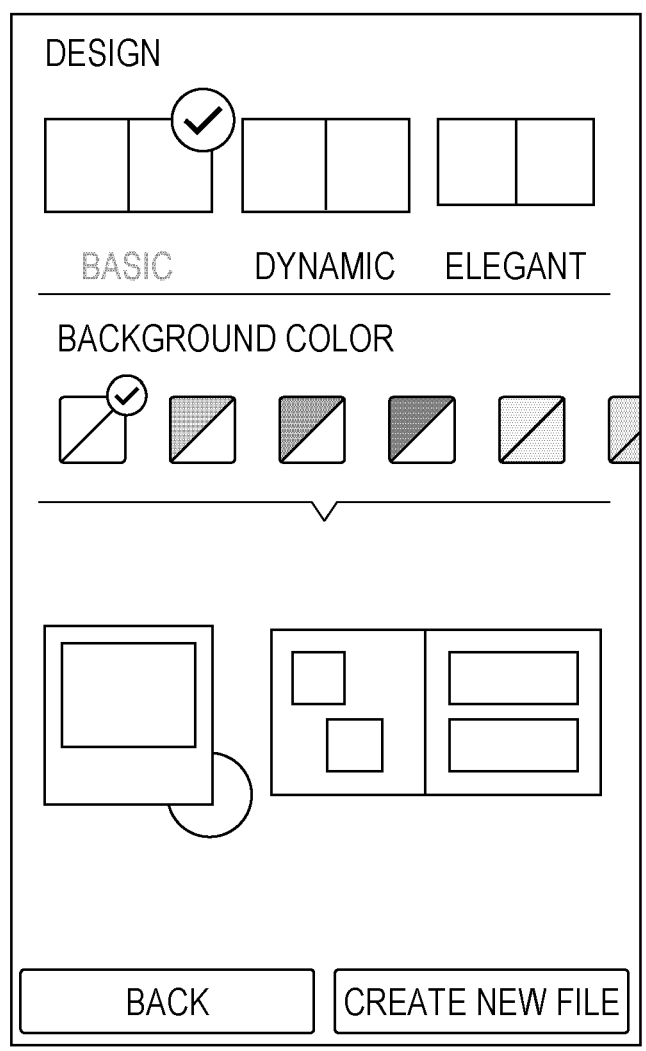
FIG. 15 illustrates an example of the screen for the photo album creation application.

In step S6003, the CPU 1011 counts the number of pieces of original image data stored in the selected folder and the number of pieces of thumbnail image data. In this case, the CPU 1011 may count only the number of pieces of original image data. For example, when a "NEXT" button is pressed on the screen illustrated in FIG. 14, the processing of step S6003 is started. The processing of step S6003 enables the CPU 1011 to recognize which original image data is stored in the local storage 1008 and which original image data is stored in the network storage. In addition to directly counting the number of pieces of original image data and the number of pieces of thumbnail image data, the numbers may be obtained from a database in which the thumbnail image data described above with reference to the flowchart of FIG. 5 and the original image data in the network storage are associated with each other. Further, an application programming interface (hereinafter abbreviated as API) for acquiring information about the synchronized folder may be prepared to count the numbers via the API. When the "NEXT" button illustrated in FIG. 14 is pressed, a screen illustrated in FIG. 15 is displayed.

In step S6004, if the number of pieces of original image data is more than a threshold for creating the photo album, the CPU 1011 proceeds to step S6007. The threshold for creating a photo album is specified based on the number of pages selected in step S6001. Specifically, the number of pieces of image data for creating an album is specified based on the selected number of pages. It is highly likely that the original image data stored in the folder selected by the user is image data that is frequently used by the user, or user's favorite image data. Accordingly, there is a possibility that a photo album that is favorable to the user can be created even when the photo album is created using only the original image data remaining in the local storage 1008. If the number of pieces of original image data is less than the above-described threshold, there is a need to download the original image data from the network storage, and thus the CPU 1011 proceeds to step S6005.

In step S6004, it may be determined whether the downloaded original image data can be stored in the local storage 1008. The preliminary determination as to whether the downloaded original image data can be stored in the local storage 1008 can prevent the free space in the local storage 1008 from being insufficient after the original image data is actually downloaded. In addition, a photo album to be created may be taken into account to determine the free space available in the local storage 1008, thereby making it possible to avoid such problems that the photo album cannot be created even after album data can be downloaded, or being unable to place an order of the photo album, or being able to print the photo album. If the capacity for downloading is equal to or greater than the free space in the local storage 1008, the photo album creation processing may not be continued and thus the processing may be interrupted.

In step S6005, the CPU 1011 selects original image data to be downloaded. The number of pieces of original image data to be downloaded is, for example, the difference between the above-described threshold and the number of pieces of original data stored in the folder (local storage) selected in step S6002. Specifically, in step S6005, if the number of pieces of original image data stored in the local storage 1008 is less than the above-described threshold, the CPU 1011 selects the original image data corresponding to the number of pieces of insufficient image data from the image data stored in an external storage. The original image data to be downloaded corresponds to the thumbnail image data stored in the folder selected in step S6002. As a selection method, the number of pieces of original image data determined in the above-described processing may be randomly selected, or may be selected by a method as described below. For example, the original image data may be selected from a file storing image data with the latest access date, or from images with highest rating (evaluation value) set by the user. In step S6005, as the image data to be downloaded, image data that is more likely to be used for creating a photo album is to be selected. Accordingly, as the original image data to be downloaded, original image data with a browsing date and time that is close to the current date and time, or original image data with high rating may be selected. Further, thumbnail image data may be created and information that characterizes a part of the original image data or the image data may be stored in association with the thumbnail image data before the original image data is deleted. As a result, the information can be used for selecting the image data to be downloaded. For example, if Exif photographic information embedded in the original image data is stored in association with the thumbnail image data, the image data to be downloaded can be selected based on a shooting date or a camera setting during shooting. As described above, when the "NEXT" button illustrated in FIG. 14 is pressed, the screen illustrated in FIG. 15 is displayed. A design is selected on the screen illustrated in FIG. 15, thereby determining a template group for layout. In this case, a template for indoor use, such as a wedding, may be selected depending on the selected design. When a template for indoor use, such as a wedding, is selected, the original image data which is highly likely to have been obtained by capturing images indoors based on photographic information such as a shutter speed may be selected. When a template for outdoor use, such as traveling, is selected, the original image data which is highly likely to have been obtained by capturing images outdoors may be selected. If the width or height of the original image data is stored, an extremely small image or an extremely large image may be excluded. In addition, if the image format of the original image data is stored, original image data of Png format or Tiff format, which is image data that is hardly obtained by image capturing using a camera, may be excluded. Further, in steps described below, the image data is analyzed to obtain a score value. If photo albums are previously created and score values are calculated and stored, original image data with a higher score value may be selected. If it is not desirable to reuse the image data previously used to create a photo album so as to create a new photo album, the information used to previously create a photo album may be stored and the original image data may be selected based on the information. Further, the thumbnail image data may be analyzed to determine the original image data to be downloaded. Also in the method of analyzing the image data to obtain the score value, if the original image data is analyzed, the size of image data captured by recent digital cameras is generally large, which leads to an increase in processing load. Accordingly, the score value is determined after the image width is reduced to, for example, 512 px, and the image data is analyzed. If the image width of the thumbnail image data created in step S4006 in the flowchart illustrated in FIG. 4 is equal to or greater than 512 px, the image data can be analyzed to obtain the score value, even when the data is not the original image. Further, the original image data with a higher score value can be selected in the same manner as in the case of storing the score value. Even when the image width of the thumbnail image data is less than 512 px, such as about 256 px, the image width is enlarged to an image width that is twice as large as the image width and then analyzed, thereby making it possible to obtain the score value although the analysis accuracy is decreased. An approximate score value can also be used to select image data with a higher score value. As the number of pieces of original image data to be downloaded, the difference between the above-described threshold and the number of pieces of original image data in the folder (local storage) selected in step S6002 is described, but instead another form may be used. For example, a number of pieces of original image data that are 1.1 times as large as the difference between the threshold and the number of pieces of original image data stored in the folder (local storage) may be downloaded.

In step S6006, the CPU 1011 downloads the original image data selected in step S6005. In the case of downloading the original image data, the processing illustrated in FIG. 4 may execute processing which is unintended by the user, such as deletion of the original image data in the local storage 1008 that is present at the time of step S6003. To avoid such processing unintended by the user, the original image data in the folder selected in step S6002 is opened before the image data selected in step S6005 is opened. In the processing of opening the image data, an access to the image data occurs and the access date and time is replaced with the latest time. Accordingly, the processing of step S4003 in the flowchart illustrated in FIG. 4 prevents the original image data in the folder selected in step S6002 from being easily selected as image data to be deleted. In addition, if there is a method for sending a list of image data that is not deleted via the API (application programming interface) to a program for executing the flowchart illustrated in FIG. 4 and excluding the image data from the processing of step S4005, the method may be executed.

In step S6007, the CPU 1011 acquires the original image data in the local storage 1008 from the folder selected by the user, and the processing proceeds to step S6008.

In step S6008, the CPU 1011 acquires the original image data from the folder selected by the user and analyzes the original image data, thereby performing scoring processing. FIG. 9 illustrates the result of scoring the selected original image data. In the scoring processing, rating information stored in image meta information may be used for scoring, and scoring may be performed based on unique standards such as a histogram of a face detection result or image data, or a frequency analysis. The image data to be used is image data of Binary Large Object (hereinafter abbreviated as BLOB) format and is converted into a format that can be stored in a database and stored.

In step S6009, the CPU 1011 divides an original image data group for each page. For example, methods such as a method of equally allocating the original image data for each page, and a method of grouping the original image data according to the shooting date and time of the original image data and allocating the original image data selected from each group to the respective pages can be employed.

To simplify the explanation, one group in a plurality of groups obtained by grouping the original image data group according to the shooting date and time will be described with reference to FIG. 9. Seven pieces of image data included in the group illustrated in FIG. 9 are candidates for the image data to be arranged on one page of a spread. In a template according to the present exemplary embodiment, four slots are arranged on one page of a spread. Accordingly, four pieces of original image data are selected as a layout target from among seven pieces of original image data by processing described below. When image data with a certain rate or less is included, grouping processing is performed after the image data with a certain rate or less is excluded.

In step S60010, the CPU 1011 lays out the original image data with a higher score in the template based on the result of scoring in step S6009. Step S60010 is executed when a "CREATE NEW FILE" button illustrated in FIG. 15 is pressed. FIG. 10 illustrates a layout calculation process.

Figures 1, 7D:
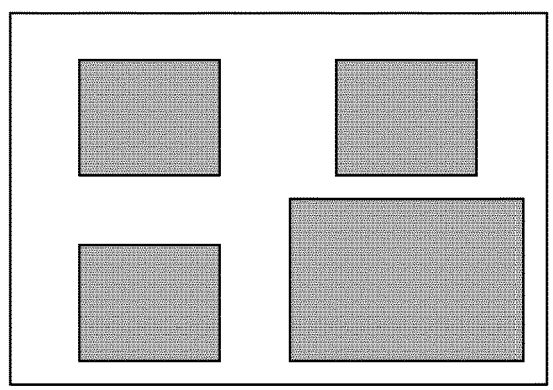
Figure 11:
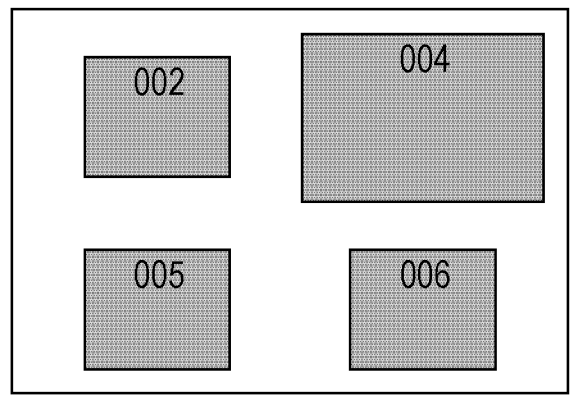
FIG. 11 illustrates an automatic photo album layout result according to the first exemplary embodiment.

For example, assume that the user has selected "BASIC" as a design on the screen illustrated FIG. 15 described above. FIGS. 7A-1 to 7D-1 illustrates a template group corresponding to "BASIC", and the number of slots is four. Accordingly, four pieces of original image data with a higher score value are acquired from an image database illustrated in FIG. 9, and the four pieces of original image data are rearranged in the order of shooting date and time. In the processing described above, values are stored in a first row (image ID) and a second row (score) in FIG. 10. Next, priorities are set from the template data illustrated in FIGS. 8A-1 to 8D-1. The priorities of templates are stored in third, fifth, seventh, and ninth rows in FIG. 10. Further, the score values of each image and the priorities are multiplied. Calculated values obtained by multiplying the score values in fourth, sixth, eighth, and tenth rows in FIG. 10 and the priorities are stored. Lastly, the sum of the calculated values is obtained and stored in the row for the total. Through these calculations, the total is obtained by multiplying the score values of the image data by the priorities set for each template. A template with a largest total value corresponds to template data automatically selected. In the present exemplary embodiment, the total of template data B-1 is highest, and thus the template B-1 is selected in the template group illustrated in FIGS. 7A-1 to 8D-1. Next, an image ID and a slot ID of the template are associated with each other. The selected template is associated with the image ID and the slit ID, so that the original image data is laid out in the template as illustrated in FIG. 11.

As a result of processing of the flow described above, if the number of pieces of original image data present in the local storage 1008 is equal to or greater than the number of pieces of original image data for creating an album, images stored in the external network storage 1012 are not used and thus the photo album can be created without causing unnecessary downloading. If the number of pieces of original image data present in the local storage 1008 is less than the number of pieces of original image data for creating an album, a number of pieces of original image data for creating a photo album are downloaded and thus the photo album can be created only by downloading the original image data. For example, assume that 10 pieces of original image data and 15 pieces of thumbnail image data are held in the local storage 1008 of the information processing apparatus 1004. Also assume that, as a result of processing of step S6004, the number (threshold) of pieces of image data for creating an album is 15. In this case, the CPU 1011 does not download 20 pieces of original image data corresponding to 20 pieces of thumbnail image data. In steps S6005 to S6006, the CPU 1011 downloads five pieces of original image data corresponding to five pieces of thumbnail image data in the 20 pieces of thumbnail image data. Further, the CPU 1011 does not download the image data corresponding to the remaining 10 pieces of thumbnail image data. As a result, the number of pieces of image data to be downloaded can be reduced, which leads to an improvement in user-friendliness. In the example described above, the CPU 1011 downloads 15 pieces of original image data corresponding to 15 pieces of thumbnail image data. However, only five pieces of original image data are used for layout processing. As a result, the number of pieces of image data to be used for analysis processing of creating an album can be reduced, which leads to an improvement in user-friendliness. In particular, in processing of creating a photo album by designating a folder, the user is often unaware that the original image is stored in the local storage 1008 or stored in the external network storage 1012. Also, in such a case, the original image data stored in the local storage 1008 is preferentially used to create a photo album, and thus the number of original image data to be downloaded from the external network storage 1012 can be reduced. As compared with processing of downloading original images after some of the original images are downloaded from the external network storage 1012 and analyzed, the free space, communication time, and communication cost for downloading the data can be suppressed. Further, as a method for seamlessly synchronizing the external network storage 1012 with the local storage 1008, the above-described method can be applied even if a unit for downloading a part of the original image data from the external network storage 1012 is not prepared.

The present exemplary embodiment illustrates a case where, when the number of pieces of original image data present in the local storage 1008 is equal to or greater than the number of pieces of original image data for creating an album, images stored in the external network storage 1012 are not used. However, other processing may also be executed. For example, assume that 120 pieces of original image data and 150 pieces of thumbnail image data are stored in the local storage 1008. Assume herein that 100 images are for creating an album. In this case, the number of pieces of original image data present in the local storage 1008 is equal to or greater than the number of pieces of original image data for creating an album, but the CPU 1011 downloads the original image data from the network storage. In this case, the CPU 1011 may download original image data less than 150 pieces of original image data, instead of downloading all the original image data corresponding to 150 pieces of thumbnail image data from the network storage. Specifically, the execution of this processing makes it possible to reduce a load due to downloading, while creating an album using the original image data stored in the local storage 1008 and the original image data stored in the network storage.

Second Exemplary Embodiment

In the first exemplary embodiment, the number of images to be downloaded from the external network storage 1012 is automatically determined, but instead the number of images may be selected by a user. A second exemplary embodiment illustrates processing of causing the user to select the number of images to be downloaded.

Descriptions of the contents that are the same as those described in the first exemplary embodiment are omitted.

Figure 12:
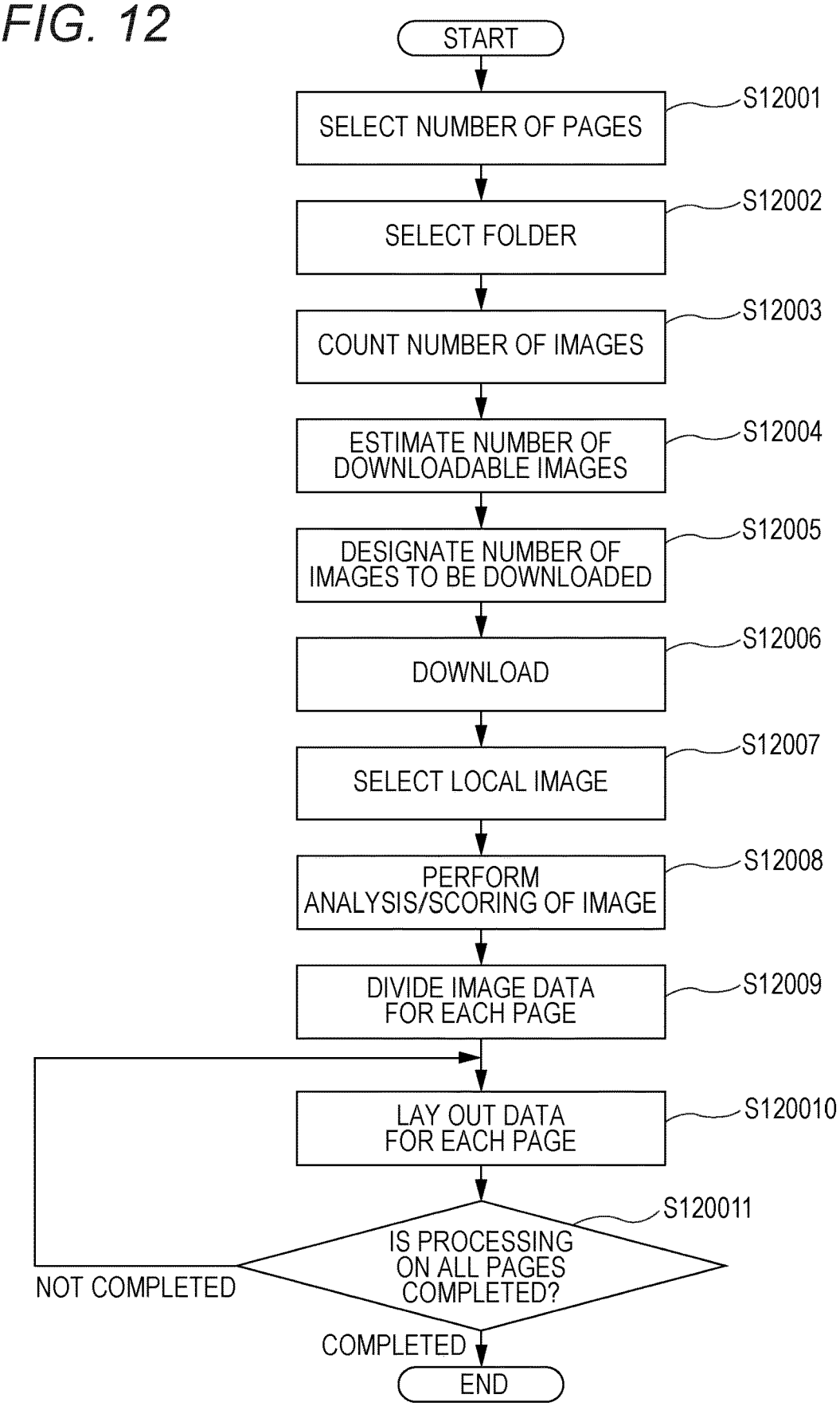
FIG. 12 is a flowchart illustrating photo album creation processing according to a second exemplary embodiment.

Photo album creation processing to be performed in the information processing apparatus 1004 by using a synchronized data folder will be described with reference to FIG. 12.

Processing of steps S12001 to S12003 is the same as the processing of steps S6001 to S6003, and thus descriptions thereof are omitted.

In step S12004, the CPU 1011 estimates the maximum number of pieces of downloadable original image data. In the present exemplary embodiment, the user explicitly selects the number of pieces of image data to be downloaded, unlike in the first exemplary embodiment. In this case, if the user is caused to select a desired number of pieces of image data, instead of selecting the minimum number of pieces of image data for creating a photo album, the free space in the local storage 1008 becomes insufficient and it is not preferable to designate the number of pieces of image data with which a photo album cannot be created. Accordingly, the CPU 1011 calculates the free space in the local storage 1008 and the user estimates the maximum number of pieces of selectable image data. As an example of the calculation method, the CPU 1011 subtracts a storage capacity, for example, for creating, ordering, and printing a photo album from the free space in the local storage 1008. Further, the capacity obtained by the calculation is divided by an average image data size, thereby estimating the maximum number of pieces of downloadable image data.

Figure 13:
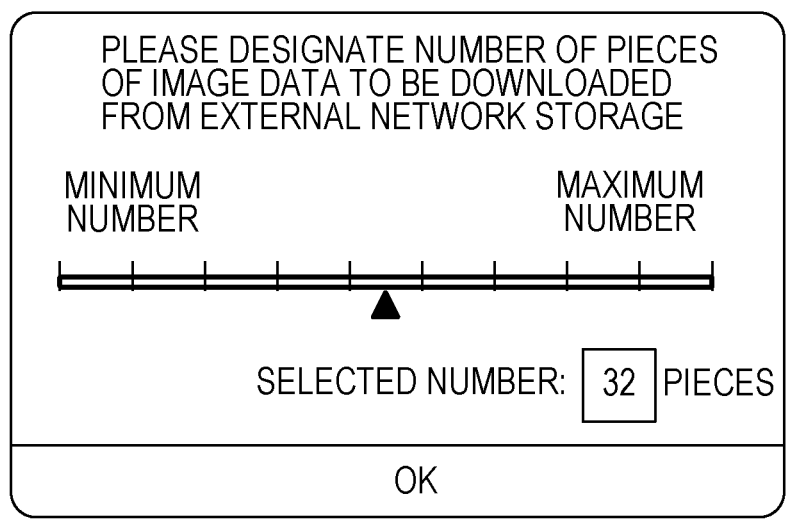
FIG. 13 illustrates a UI according to the second exemplary embodiment.

In step S12005, the CPU 1011 accepts the designation of the number of pieces of image data to be downloaded from the user using the UI illustrated in FIG. 13. The number of pieces of image data to be downloaded is reduced by adjusting a triangular slider bar illustrated in FIG. 13 to drug the slider left, and the number of pieces of image data to be downloaded is increased by dragging the slider right. The number of pieces of image data to be downloaded is displayed in an edit box located at a lower right position, and 32 pieces of image data are currently designated. If a minimum number of pieces of image data is to be downloaded, the slider may be dragged left. The minimum number of images corresponds to the minimum number of pieces of original image data for creating a photo album based on the number of pieces of original image data obtained in step S12003. On the other hand, the maximum number of images corresponds to the number of images estimated in step S120004. In step S12004, the number of images downloadable from the free space in the local storage 1008 is estimated. Accordingly, the images can be downloaded without any problem even when the user selects the maximum number of images.

Processing of steps S12006 to S120011 to be subsequently executed is the same as the processing of steps S6006 to S60011, and thus detailed descriptions thereof are omitted.

The processing of the flow described above enables images stored in the external network storage 1012 to be downloaded as layout candidates in accordance with the designation by the user even when an album can be created using only the image data present in the local storage 1008. Also, in this case, the maximum number of pieces of downloadable original image data is estimated from the free space in the local storage 1008, thereby enabling downloading of the image data to create a photo album while preventing the free space in the local storage 1008 from being insufficient.

The present disclosure provides technological improvements or unconventional solutions in communication technology through use of specific manners of use with specific limitations on available data and configurational states.

Other Exemplary Embodiments

The exemplary embodiments described above can also be implemented by executing the following processing. Specifically, software (program) for implementing the functions of the exemplary embodiments described above is supplied to a system or device through a network or various storage media. Then, a computerized configuration(s) (e.g., a CPU (central processing unit), an MPU (micro processing unit), a processor/memory configuration, or the like) of the system or device may read a program and execute the program. The program may be executed by one computer, or a plurality of computers may be caused to cooperate with each other to execute the program. All the processing described above need not necessarily implemented by software, and a part of the whole processing may be implemented by hardware such as an ASIC (application specific integrated circuits). Instead of performing all the processing using one CPU, the processing may be performed using a plurality of CPUs in cooperation, as needed.

According to the present disclosure, it is possible to improve the user-friendliness in creating a photo album.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like. While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-115991, filed Jun. 13, 2017, which is hereby incorporated by reference herein in its entirety.

What is claimed is:

1. A communication apparatus that holds first original image data and thumbnail image data corresponding to second original image data, the second original image data corresponding to the thumbnail image data being held in an external storage capable of communicating with the communication apparatus, the communication apparatus comprising:

a specifying unit configured to specify a number of pieces of image data for creating data for printing;

a designation unit configured to designate a folder in the communication apparatus; and a control unit configured to, in a case where the first original image data and a first number of pieces of thumbnail image data are stored in the designated folder and a number of pieces of the first original image data stored in the designated folder is less than the specified number, execute processing of creating the data for printing using the first original image data and the second original image data by acquiring, from the external storage, the second original image data corresponding to a second number of pieces of thumbnail image data, the second number being smaller than the first number, and in a case where the first original image data and the first number of pieces of thumbnail image data are stored in the designated folder and the number of pieces of the first original image data stored in the designated folder is greater than or equal to the specified number, execute the processing of creating the data for printing using the first original image data stored in the designated folder without using the second original image data stored in the external storage.

2. The communication apparatus according to claim 1, further comprising a selection unit configured to select the second original image data corresponding to a number of pieces of insufficient original image data from the second original image data stored in the external storage in a case where the first original image data and the first number of pieces of thumbnail image data are stored in the designated folder and the number of pieces of the first original image data stored in the designated folder is less than the specified number.

3. The communication apparatus according to claim 2, wherein the second original image data corresponding to the number of pieces of insufficient original image data is selected based on an access date and time of access to the second original image data stored in the external storage.

4. The communication apparatus according to claim 2, wherein the second original image data corresponding to the number of pieces of insufficient original image data is selected based on an evaluation value for the second original image data stored in the external storage.

5. The communication apparatus according to claim 1, further comprising an accepting unit configured to accept a setting about a number of pages of the data for printing, wherein the number of pieces of image data for creating the data for printing is specified based on the accepted number of pages.

6. A control method to be executed in a communication apparatus configured to hold first original image data and thumbnail image data corresponding to second original image data, the second original image data corresponding to the thumbnail image data being held in an external storage capable of communicating with the communication apparatus, the control method comprising:
specifying a number of items of image data for creating data for printing;
designating a folder in the communication apparatus;
in a case where the first original image data and a first number of pieces of thumbnail image data are stored in the designated folder and a number of pieces of the first original image data stored in the designated folder is less than the specified number, executing processing of creating the data for printing using the first original image data and the second original image data by acquiring, from the external storage, the second original image data corresponding to a second number; and
in a case where the first original image data and the first number of pieces of thumbnail image data are stored in the designated folder and the number of pieces of the first original image data stored in the designated folder is greater than or equal to the specified number, executing the processing of creating the data for printing using the first original image data stored in the designated folder without using the second original image data stored in the external storage.

7. The control method according to claim 6, further comprising selecting the second original image data corresponding to a number of pieces of insufficient original image data from the second original image data stored in the external storage in a case where the first original image data and the first number of pieces of thumbnail image data are stored in the designated folder and the number of pieces of the first original image data stored in the designated folder is less than the specified number.

8. The control method according to claim 7, wherein the second original image data corresponding to the number of pieces of insufficient original image data is selected based on an access date and time of access to the second original image data stored in the external storage.

9. The control method according to claim 7, wherein the second original image data corresponding to the number of pieces of insufficient original image data is selected based on an evaluation value for the second original image data stored in the external storage.

10. The control method according to claim 6, further comprising accepting a setting about a number of pages of the data for printing, wherein the number of pieces of image data for creating generating the data for printing is specified based on the accepted number of pages.

11. A storage medium storing a program for executing a control method to be executed in a communication apparatus configured to hold first original image data and thumbnail image data corresponding to second original image data, the second original image data corresponding to the thumbnail image data being held in an external storage capable of communicating with the communication apparatus, the control method comprising:
specifying a number of items of image data for creating data for printing;
designating a folder in the communication apparatus;
in a case where the first original image data and a first number of pieces of thumbnail image data are stored in the designated folder and a number of pieces of the first original image data stored in the designated folder is less than the specified number, executing processing of creating the data for printing using the first original image data and the second original image data by acquiring, from the external storage, the second original image data corresponding to a second number of pieces of thumbnail image data, the second number being smaller than the first number; and
in a case where the first original image data and the first number of pieces of thumbnail image data are stored in the designated folder and the number of pieces of the first original image data stored in the designated folder is greater than or equal to the specified number, executing the processing of creating the data for printing using the first original image data stored in the designated folder without using the second original image data stored in the external storage.

12. The storage medium according to claim 11, wherein the control method further comprises selecting the second original image data corresponding to a number of pieces of insufficient original image data from the second original image data stored in the external storage in a case where the first original image data and the first number of pieces of thumbnail image data are stored in the designated folder and the number of pieces of the first original image data stored in the designated folder is less than the specified number.

13. The storage medium according to claim 12, wherein the second original image data corresponding to the number of pieces of insufficient original image data is selected based on an access date and time of access to the second original image data stored in the external storage.

14. The storage medium according to claim 13, wherein the second original image data corresponding to the number of pieces of insufficient original image data is selected based on an evaluation value for the second original image data stored in the external storage.

15. The storage medium according to claim 11, wherein the control method further comprises accepting a setting about a number of pages of the data for printing, and the number of pieces of image data for creating the data for printing is specified based on the accepted number of pages.

16. The communication apparatus according to claim 1, wherein the data for printing is album data.

17. The control method according to claim 6, wherein the data for printing is album data.

* * * * *